July 16, 1963  D. L. McNALLY  3,097,871
COUPLING DEVICE
Filed July 5, 1961
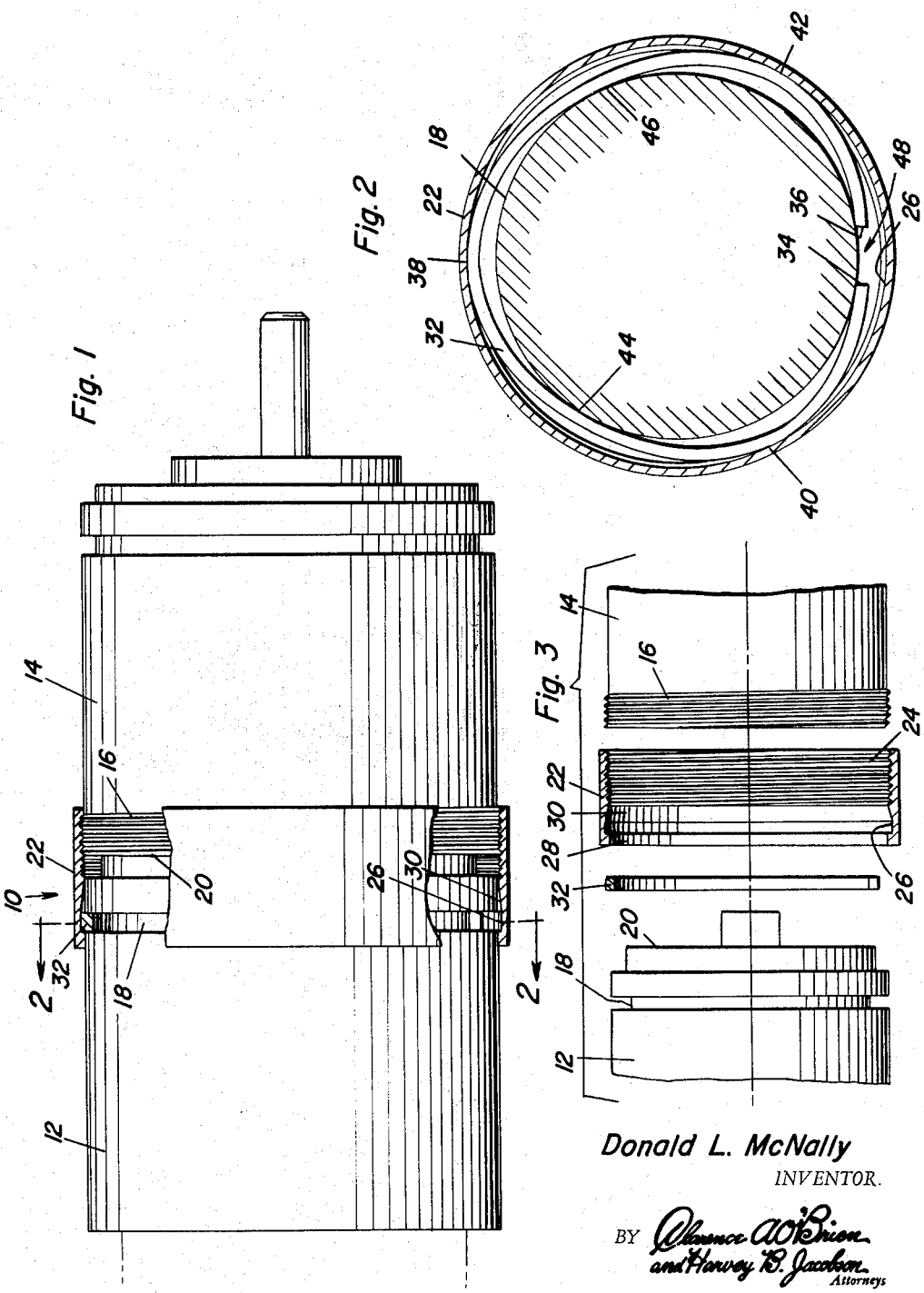
Donald L. McNally
INVENTOR.

United States Patent Office 3,097,871
Patented July 16, 1963

3,097,871
COUPLING DEVICE
Donald L. McNally, Grantsburg, Wis., assignor to McNally Bros. Machine & Gear Company, Inc., Grantsburg, Wis., a corporation of Wisconsin
Filed July 5, 1961, Ser. No. 121,916
4 Claims. (Cl. 287—117)

This invention relates to a coupling device for clamping the abutting ends of two coaxially alined members and more particularly, to a coupling device for clamping a motor casing to a gear head.

It is therefore a primary object of the present invention to provide a mechanically simple yet effective coupling device between a motor casing and a gear head in which clamping pressure is equally applied to both the motor casing and gear head.

An additional object of this invention is to provide a coupling device between motor casings and gear heads of different sizes, which coupling device may be readily removed for disassembly of the motor and gear head and yet effective to securely clamp the two together.

In accordance with the foregoing objects, the coupling device of the present invention involves a tubular coupling ring which is disposed in axial overlapping relation between the abutting ends of a motor and gear head or for that matter any two coaxially alined abutting members that one desires to couple. The coupling ring is threadedly secured to one of the abutting end members so that it may be axially adjusted with respect to the other member for radially alining an internal annular groove in the coupling ring with an external annular groove in the abutting member. A coupling spring element which is split and yieldable, is disposed between the radially alined grooves in the coupling ring and abutting member in order to axially lock the coupled assembly. The coupling spring member is however so deformed with respect to the annular surfaces in the radially alined grooves of the abutting member and the coupling ring, that it frictionally engages the coupling ring and abutting member alternatively at equally spaced apart locations preferably 60 degrees apart. A conical camming surface connects the internal annular groove in the coupling ring with the threaded portion thereof so that when the coupling ring is axially displaced in one direction with respect to the coupled member having the external annular groove therein, the coupling spring element will be compressed into the groove permitting the coupling ring to be axially unlocked in order to disassemble the coupling device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a motor casing and gear head assembly coupled by means of the novel coupling device of the present invention, parts of the assembly being broken away for purposes of illustration.

FIGURE 2 is a sectional view taken substantially through a plane indicated by section line 2—2 in FIGURE 1.

FIGURE 3 is a disassembled view of the parts constituting the coupling device of the present invention.

Referring now to the drawing in detail, a coupling device generally referred to by reference numeral 10 is shown in FIGURE 1 axially clamping together an assembly of a motor casing 12 and a gear head 14. It will of course be appreciated, that the coupling device 10 may be applied to other type housing members that are coaxially alined in abutting end relation to each other. The abutting ends of the housing members 12 and 14 are provided respectively with externally threaded portions 16 and an annular housing groove 18 which is spaced from the abutting end 20 of the housing member 12. The threaded portion 16 and the housing groove 18 cooperate with a tubular coupling ring 22 which is disposed in axially overlapping relation to the abutting end portions of the housing members 12 and 14 for such purpose.

The coupling ring 22 as more clearly seen in FIGURE 3, is disposed adjacent one axial end thereof with an internally threaded portion 24 for the purpose of threadedly securing the coupling ring 22 to the threaded portion 16 of the housing member 14. Accordingly, the coupling ring 22 may be removably secured to the housing member 14 and axially adjusted with respect thereto so that when the housing member 12 is in abutting relation to the housing member 14, an annular internal coupling groove 26 formed in the coupling ring 22 may be radially alined with the housing groove 18 on the member 12. The coupling groove 26 therefore forms a shoulder surface 28 on the coupling ring 22 that rests on the external surface of the housing member 12. The coupling groove 26 is however connected to the internally threaded portion 24 of the coupling ring by means of a conical camming surface 30.

When the coupling groove 26 is radially alined with the housing groove 18, the coupling ring will axially lock the member 12 to the member 14 by means of a yieldable coupling spring member 32 that is disposed within and between the confronting grooves 26 and 18. As more clearly seen in FIGURE 2, the coupling spring member 32 is split having split ends 34 and 36 and is of such shape with respect to the annular surfaces of the confronting grooves 26 and 18, that the coupling member 32 frictionally engages the internal surface of the coupling groove 26 at equally spaced circumferential locations 38, 40 and 42 which are 120 degrees apart. The coupling member 32 on the other hand frictionally engages the annular surface of the groove 18 also at locations 44, 46 and 48 which are circumferentially spaced apart by 120 degrees. However, the contact portions on the internal surface of the groove 26 are circumferentially spaced from the contact portions on the external surface of the groove 18 by 60 degrees so that the coupling spring member alternately engages the surfaces on the confronting grooves at 60 degrees spacing.

From the foregoing description, it will be apparent that the coupling device of the present invention is effective to couple coaxial alined members in abutting relation to each other to thereby reduce the coupling space. Furthermore, the action of the coupling spring member 32 is such as to equally apply gripping pressure to the coupling ring and member 12 for equal clamping to both coupled members 12 and 14. The coupling spring member 32 will also prevent axial disassembly by virtue of its disposition in and between the confronting grooves 26 and 18. However should it be desired to disassemble the members, it will only be necessary to axially displace the coupling ring 22 with respect to the member 12 in one direction to cause the conical camming surface 30 on the coupling ring to compress the coupling spring member 32 into the groove 18 and thereby unlock the coupling ring from the member 12. It will however be appreciated that disassembly can only be effected by displacement of the coupling ring with respect to the member 12 in one direction only. Disassembly is not however possible through any axial pull on the coupled members 12 and 14 with respect to each other.

The foregoing is considered as illustrative only of the principles of the invention. Further, since numerous modifications and changes will readily occur to those skilled in the art, it is not desired to limit the invention

What is claimed as new is as follows:

1. A coupling device for clamping abutting ends of housing members respectively provided with an external threaded portion and an annular housing groove, comprising, a coupling ring having internal threads at one axial end for threadedly engaging the threaded portion on one of the housing members, an internal coupling groove formed in the coupling ring adjacent the other axial end in radial alignment with the annular groove on the other of the housing members and a split coupling spring member disposed between the coupling groove and housing groove and alternately engageable with the housing member and coupling ring at circumferentially spaced points 60° apart for locking the housing members together, said coupling ring including an internal conical camming surface connecting and extending between the coupling groove and the internal threads for unlocking of the coupling device by axial displacement of the coupling ring in one direction with respect to the housing groove.

2. A coupling device for clamping abutting ends of two members in coaxial alignment comprising a coupling ring having an internal coupling groove positioned in radial alignment with an external groove on one of said abutting members, a yieldable coupling element disposed between said grooves and alternately engageable with the coupling ring and said one member at equally spaced points 60° apart for locking the coupling ring to said one member, and means on the coupling ring for compressing the coupling element to unlock the coupling ring from said one member in response to axial displacement of the coupling ring in one direction with respect to the coupling groove.

3. The combination of claim 2 including means for securing the coupling ring to the other of said members operative to radially align the grooves when the members are in end abutting relation to each other.

4. A coupling device for clamping abutting ends of two members comprising, tubular means axially overlapping the abutting ends of the members, confronting groove means formed in the tubular means and one of said abutting ends, securing means coupling the tubular means to the other of said abutting members, said securing means allowing for the axial adjustment of the tubular means for radially aligning the confronting groove means, yieldable coupling means equally engageable with the tubular means and said one member within the confronting groove means for axially locking the abutting ends of the two members, said yieldable coupling means comprising a split spring element alternatively engageable with the tubular means and said one member at equally spaced locations, and camming surface means on the tubular means for engaging and compressing the yieldable means to axially unlock the coupling device in response to axial displacement of the tubular means in one direction with respect to said one member.

References Cited in the file of this patent

UNITED STATES PATENTS

| | | |
|---|---|---|
| 459,910 | Hogan | Sept. 22, 1891 |
| 1,464,337 | Price et al. | Aug. 7, 1923 |
| 1,572,770 | Colley | Feb. 9, 1926 |
| 2,755,699 | Forster | July 24, 1956 |
| 2,874,741 | Brancato | Feb. 24, 1959 |

FOREIGN PATENTS

| | | |
|---|---|---|
| 688,746 | Great Britain | Mar. 11, 1953 |
| 275,904 | Switzerland | Sept. 1, 1951 |